Jan. 24, 1950  W. R. AMSTUTZ  2,495,309
FOOD GRINDER HAVING A SPLIT CASING
Filed Dec. 13, 1946  2 Sheets-Sheet 1
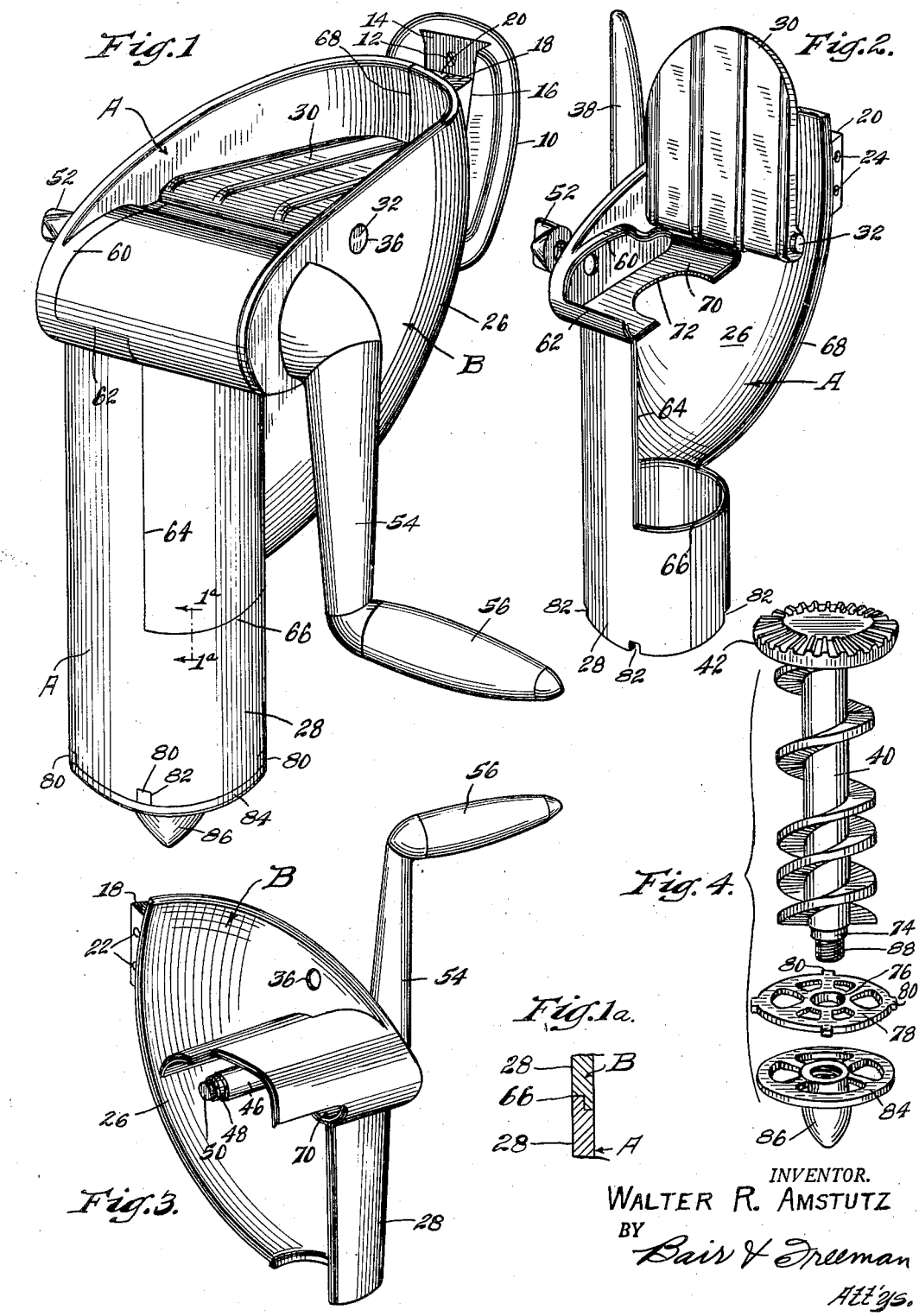
INVENTOR.
WALTER R. AMSTUTZ
BY Jan. 24, 1950 W. R. AMSTUTZ 2,495,309
FOOD GRINDER HAVING A SPLIT CASING
Filed Dec. 13, 1946 2 Sheets-Sheet 2
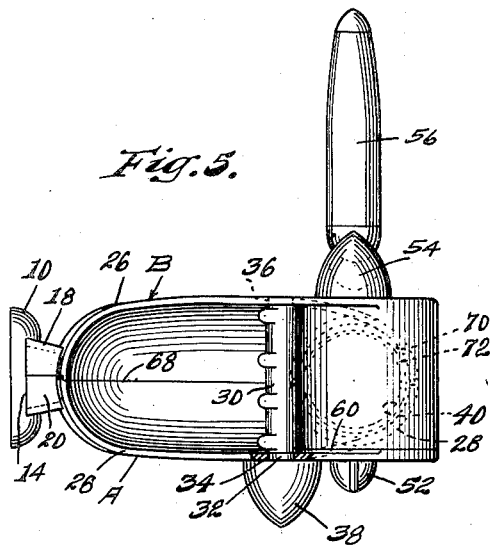
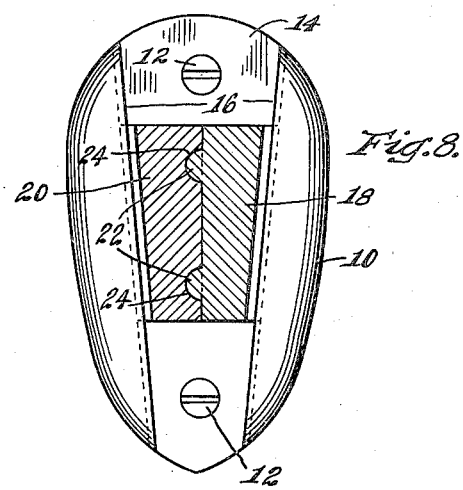
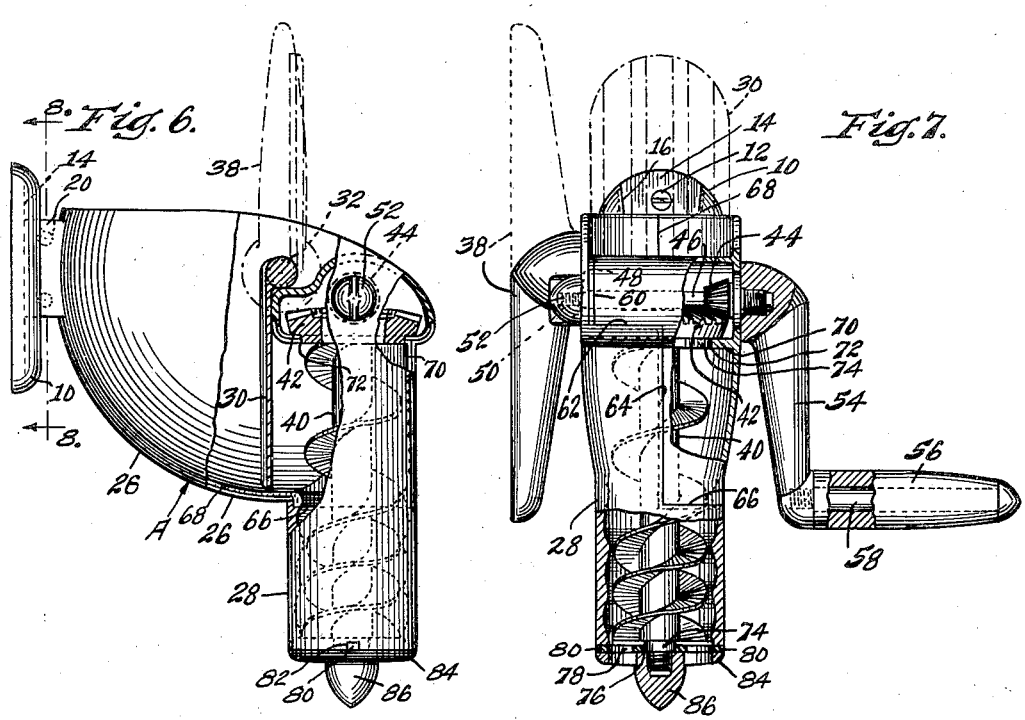
INVENTOR.
WALTER R. AMSTUTZ
BY
Att'ys.

Patented Jan. 24, 1950

2,495,309

UNITED STATES PATENT OFFICE 2,495,309

FOOD GRINDER HAVING A SPLIT CASING

Walter R. Amstutz, Chicago, Ill., assignor to Butler Brothers, Chicago, Ill., a corporation of Illinois Application December 13, 1946, Serial No. 715,923

4 Claims. (Cl. 146—192)

This invention relates to a food chopper particularly designed for removable mounting on a wall bracket.

One object of the invention is to provide a food chopper comprising a two-part casing which may be readily taken apart for cleaning when the casing is removed from the wall bracket.

Another object is to provide the casing with interfitting parts that are received in the wall bracket to hold the casing together at one point, a crank shaft being provided with a nut for holding the casing together at another point.

Still another object is to provide the feed screw of the food chopper arranged to rotate on a vertical axis whereby gravity aids in the feed of the material to the cutter plates, a geared-down connection being provided between the crank shaft and the feed screw for ease of operation of the screw.

A further object is to provide a feed chute formed on a radius, and a feed plate swingable in the chute, a handle for operating the feed plate being provided outside the casing of the food chopper so that all danger of the operator getting his fingers into the feed screw is eliminated.

With these and other objects in view, my invention consists in the construction, arrangement and combination of the various parts of my food chopper whereby the objects mentioned as well as other obvious objects contemplated are attained, as hereinafter more fully set forth, pointed out in my claims and illustrated in the accompanying drawings, wherein:

Figure 1 is a perspective view of a food chopper embodying my invention.

Figure 1a is a sectional line on the line 1a—1a of Figure 1.

Figure 2 is a reduced scale perspective view showing one part only of the casing of the food chopper.

Figure 3 is a perspective view of the companion part of the casing and the operating crank.

Figure 4 is an exploded perspective view of the operating parts of the food chopper removed from the casing.

Figure 5 is a plan view of the food chopper.

Figure 6 is a side elevation thereof with parts broken away and other parts shown in section.

Figure 7 is a front elevation thereof with parts broken away and other parts shown in section, and Figure 8 is an enlarged sectional view on the line 8—8 of Figure 6.

On the accompanying drawings I have used the reference numeral 10 to indicate a bracket which may be secured to a kitchen wall, pantry wall or other wall as of a cabinet by means of counter-sunk wood screws 12 or any suitable means. The bracket 10 has a dove-tail notch, the floor of which is indicated at 14 and the sides of which are indicated at 16. The sides 16 taper inwardly and downwardly as shown in Figure 8 for a purpose which will hereafter appear.

The casing of the food chopper is formed of two parts indicated generally at A and B. The parts A and B have mounting lugs 18 and 20 which are adapted to fit the dove-tail 14—16 as shown in Figure 8, the lug 18 having a pair of projections 22 entering sockets 24 of the lug 20. This arrangement insures that the lugs 18 and 20 will be properly indexed in relation to each other and crowded into close contact as the lugs 18 and 20 are pushed downwardly in the notch 14—16 manually and due to gravity.

The casing A—B has a feed chute portion 26 and a feed screw portion 28. A feed plate 30 is pivotally mounted by having a shaft 32 pivoted in an opening 34 of the casing half A and an opening 36 of the casing half B. A lever 38 is mounted on the shaft adjacent and on the outside of the casing half A for the purpose of imparting swinging action to the feed plate 30 as from the position of Figure 2 (dot and dash position of Figures 6 and 7) and the full line position of Figures 6 and 7.

In the position of Figure 2 the chute 26 is open for the introduction of meat or other commodities to be chopped in the food chopper and the feed plate 30 may then be swung through a 180 degree arc by applying pressure on the handle 38 for positively feeding the material to the operating mechanism of the food chopper.

The operating mechanism consists of a feed screw 40 having the usual spiral conveyor thread, coarse at the top and finer at the bottom. The feed screw has at its upper end a bevel gear 42. The bevel gear 42 meshes with a bevel pinion 44 mounted on a shaft 46. The shaft 46 is rotatable in the casing half B and has a reduced end 48 which rotates in the casing half A. A further reduced end 50 is threaded to receive a retainer nut 52. On the end of the shaft 46 a crank arm 54 is attached as by a screw threaded connection, and a crank handle 56 is rotatable on a stud 58 extending from the crank arm.

It will be noted that the casing A—B is provided with a parting line formed in several sections indicated at 60, 62, 64, 66 and 68. Between the bevel gear and pinion and the feed screw 40 a partition 70 is provided, half of which is formed in the casing half A, and the other half in the casing half B.

The partition 70 has an opening 72 which journals a shouldered portion 74 of the feed screw 42. The parting line 60 and the parting line between the two halves of the partition 70 are rabbeted as shown in Figure 1a. This provides a tight, well-fitting joint which can be readily formed when the casing halves are made of die castings.

The lower end of the feed screw 40 is reduced as at 74 and this portion rotates in an opening 76 of the stationary cutter plate 78. The plate 78 is held stationary by means of four lugs 80 thereon fitting notches 82 of the feed screw portion 28 of the casing A—B. The plate 78 is in turn held in position by a rotary cutter plate 84 having an integral nut 86 threaded on a further reduced portion 88 of the lower end of the feed screw 40. This arrangement effects rotation of the cutter plate 84 simultaneously with the feed screw 40 for causing this plate to shear off meat or the like forced through the openings of the stationary cutter plate 78 by the feed screw.

My food chopper is comparatively simple and inexpensive to manufacture. It can be left mounted on the wall or taken down when not needed, as desired. After use it is readily cleaned by the removal of the food chopper from the bracket and the two nuts 52 and 86. Removal of the nut 52 permits the casing parts A and B to be disassociated from each other as in Figures 2 and 3 for ready cleaning of all internal surfaces. Removal of the nut 86 permits the cutter plates 78 and 84 to be taken off the feed screw and the feed screw then lifted out of its position in the opening 72 of the partition 70 as in Figure 4. All the parts in Figures 2, 3 and 4, can obviously be readily cleaned and the re-assembly of the parts involves only the putting thereof together, the rescrewing of the nuts 52 and 86 in position and the mounting of the food chopper on the bracket 10. The food chopper is then ready for operation.

Due to the vertical mounting of the feed screw, gravity aids in the feeding of material through the chopper. Gravity also aids in the feeding of the material into the feed screw in addition to manual pressure applied by the feed plate 30. The operator swings the feed plate 30 by means of the lever 38 from a position entirely outside the food chopper casing so there is no danger of getting his fingers into the operating mechanism.

Some changes may be made in the construction and arrangement of the parts of my food chopper without departing from the real spirit and purpose of my invention, and it is my intention to cover by my claims any modified forms of structure or use of mechanical equivalents which may be reasonably included within their scope.

I claim as my invention:

1. In a food chopper, a casing having a feed screw portion, a feed screw therein and arranged on a vertical axis, a crank shaft arranged on a horizontal axis, step-down bevel gearing for operatively connecting said crank shaft to said feed screw, a stationary cutter plate at the lower end of said feed screw, a rotary cutter plate coacting therewith and mounted on the lower end of said feed screw, said casing having a feed chute portion located at the side of said feed screw portion, said casing being formed in two parts with a parting line between the parts, and means for retaining said parts together at one point, comprising a retainer nut on said crank shaft, and for retaining said parts together at another point, comprising a mounting lug on each casing half adapted to be confined in a socket of a mounting bracket.

2. In a food chopper, a casing having a feed screw portion, a feed screw therein, a crank shaft for operating said feed screw, a stationary cutter plate, a rotary cutter plate coacting therewith and mounted on said feed screw for rotation therewith, said casing having a feed chute portion located for conducting material to said feed screw portion, said casing being formed in two parts, and means for retaining said parts closed at two points, comprising a retainer nut on said crank shaft and a mounting lug on each casing half adapted to be confined in a socket of a mounting bracket.

3. A food chopper of the character disclosed comprising a two part casing, said parts being separable from each other, a mounting bracket for said casing, said casing parts having lugs adapted to be wedged in a dove-tail notch of said bracket for holding said casing together at one point, an operating shaft, a retainer nut for said shaft operable to connect said casing parts together at another point, a feed screw operatively connected with said shaft, and stationary and rotatable cutter plates mounted on said casing and feed screw, respectively.

4. In a food chopper, a casing having a feed screw portion, a feed screw therein and arranged on a vertical axis, a crank shaft arranged on a horizontal axis, step-down bevel gearing for operatively connecting said crank shaft to said feed screw, a stationary cutter plate at the lower end of said feed screw, a rotary cutter plate coacting therewith and mounted on the lower end of said feed screw, said casing having a feed chute portion located at the side of said feed screw portion, said casing being formed in two parts with a parting line between the parts, means for retaining said parts together at one point, comprising a retainer nut on said crank shaft, and for retaining said parts together at another point, comprising a mounting lug on each casing half adapted to be confined in a socket of a mounting bracket and a feed plate pivoted in said chute portion adapted for forcing materials from the chute portion into the feed screw portion, said feed plate being pivoted in the two parts forming the casing and being removable therefrom when the parts are separated.

WALTER R. AMSTUTZ.

REFERENCES CITED

The following references are of record in the file of this patent:

UNITED STATES PATENTS

| Number | Name | Date |
|---|---|---|
| 43,427 | Perry | July 5, 1864 |
| 473,166 | Shepard | Apr. 19, 1892 |
| 1,647,196 | Rollman | Nov. 1, 1927 |
| 1,675,809 | Knowlton | July 3, 1928 |
| 1,787,734 | Rowling | Jan. 6, 1931 |
| 2,106,711 | Berkman | Feb. 1, 1938 |
| 2,174,140 | Schofield | Sept. 26, 1939 |
| 2,410,709 | Brooks | Nov. 5, 1946 |

FOREIGN PATENTS

| Number | Country | Date |
|---|---|---|
| 9,663 | Austria | June 15, 1902 |